(12) United States Patent
Noe

(10) Patent No.: US 6,594,408 B1
(45) Date of Patent: Jul. 15, 2003

(54) METHOD FOR COMPENSATING POLARIZATION MODE DISPERSION IN A WAVEGUIDE AND A POLARIZATION MODE DISPERSION COMPENSATOR

(75) Inventor: Reinhold Noe, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/743,529

(22) PCT Filed: Jun. 24, 1999

(86) PCT No.: PCT/DE99/01846
§ 371 (c)(1),
(2), (4) Date: Jan. 10, 2001

(87) PCT Pub. No.: WO00/03505
PCT Pub. Date: Jan. 20, 2000

(30) Foreign Application Priority Data

Jul. 10, 1998 (DE) .......................... 198 30 990

(51) Int. Cl.[7] .......................... G02B 6/10; G02B 6/14; H04B 10/18
(52) U.S. Cl. .......................... 385/11; 385/27; 385/28; 385/40; 359/161
(58) Field of Search .......................... 385/11, 1–3, 14, 385/27, 28, 40; 359/122, 153, 156, 161, 246, 249

(56) References Cited

U.S. PATENT DOCUMENTS 5,311,346 A * 5/1994 Haas et al. .................. 359/156
5,327,511 A * 7/1994 Heismann et al. ............. 385/1
5,473,457 A 12/1995 Ono 2001/0028760 A1 * 10/2001 Yaffe .......................... 385/27
2002/0015548 A1 * 2/2002 Jiang .......................... 385/11

FOREIGN PATENT DOCUMENTS

| DE | 198 16 178 | 10/1999 |
| EP | 0 716 516 | 6/1996 |
| FR | 2 758 029 | 7/1998 |
| GB | 2362962 | * 12/2001 |
| WO | WO 95/34141 | 12/1995 |
| WO | WO 02/071661 A2 | * 9/2002 |

OTHER PUBLICATIONS

Ioki et al, "Bandwidth limitation due to polarization mode dispersion", Optical Fiber Communication Conference 1995 of the Optical Society of America, *OFC '95 Technical Digest*, paper WQ2, pp. 190–192. (month unknown).

Fred Heismann, "Integrated–Optic Polarization Transformer for Reset–Free Endless Polarization Control", *IEEE Journal of Quantum Electronics*, vol. 25, No. 8, Aug. 1989, pp. 1898–1906.

Kragl et al, "Integrated optic polymeric components fabricated with microstructured strip–off covers", *Electronics Letters*, vol. 34, No. 14, Jul. 9, 1998, pp. 1396–1398.

Fetterman et al, "Polymer Modulators with Bandwidth Exceeding 100 GHz", *ECOC '98*, Sep. 20–24, 1998, Madrid, Spain, pp. 501–502.

(List continued on next page.)

*Primary Examiner*—Rodney Bovernick
*Assistant Examiner*—Mike Stahl
(74) *Attorney, Agent, or Firm*—Bell Boyd & Lloyd LLC

(57) ABSTRACT

A polarization mode dispersion compensator including a number of polarization mode converters. At least three mode converters, or at least three groups of mode converters, are individually actuated by at least three control voltages to compensate for PMD.

22 Claims, 11 Drawing Sheets

OTHER PUBLICATIONS

Beresnev et al, "Deformed helix ferroelectric liquid crystal display: a new electrooptic mode in ferroelectric chiral smectic C liquid crystals", *Liquid Crystals* (1989), vol. 5, No. 4, pp. 1171–1177. (month unknown).

Heise et al, "Optical Phased Array Filter Module with Passively Compensated Temperature Dependence", *ECOC '98*, Sep. 20–24, 1998, Madrid, Spain, pp. 319–320.

Hida et al, "Integrated 1×32 PLC–Splitter with 32 WDM Couplers for Fiber Line Testing at 1.65$\mu$m", *ECOC '98*, Sep. 20–24, 1998, Madrid, Spain, pp. 321–322.

Okawa et al, "Low Loss and Wide Passband Arrayed Waveguide Grating Demultiplexer", *ECOC '98*, Sep. 20–24, 1998, Madrid, Spain, pp. 323–324.

Offrein et al, "Tunable Optical Add/Drop Components in Silicon–Oxynitride Waveguide Structures", *ECOC '98*, Sep. 20–24, 1998, Madrid, Spain, pp. 325–326.

Hattori et al, "All–PLC–Based Optical ADM with High Isolation and Polarization–Independent Level Equalizer", *ECOC '98*, Sep. 20–24, 1998, Madrid, Spain, pp. 327–328.

Heismann et al, "Integrated–Optical Single–Sideband Modulator and Phase Shifter", *IEEE Journal of Quantum Electronics*, vol. QE–18, No. 4, Apr. 1982, pp. 767–771.

Nolting et al, "TE–TM Polarization Transformer with Reset–Free Optical Operation for Monolithic Integrated Optics", *Proceedings of the Fourth European Conference on Integrated Optics ECIO 87*, Glasgow, Scotland, May 11–13, 1987, pp. 115–118.

Takahashi et al, "Automatic compensation technique for timewise fluctuating polarisation mode dispersion in in–line amplifier systems", *Electronics Letters*, vol. 30, No. 4, Feb. 17, 1994, pp. 348–349.

Yoshimura et al, "Polarization Mode Dispersion Equalization", *Fifth Opto–Electronics Conference (OEC '94) Technical Digest*, Jul. 1994, pp. 258–259.

Voges et al, "Integrated–Optic Devices on LiNbO$_3$ for Optical Communication", *Journal of Lightwave Technology*, vol. LT–5, No. 9, Sep. 1987, pp. 1229–1238.

Baba et al, "Observation of light propagation in photonic crystal optical waveguides with bends", *Electronics Letters*, vol. 35, No. 8, Apr. 15, 1999, pp. 654–655.

Ulrich et al, "Polarization optics of twisted single–mode fibers", *Applied Optics*, vol. 18, No. 13, Jul. 1, 1979, pp. 2241–2251.

Heismann et al, "Electro–Optically Tunable, Narrowband Ti:LiNbO$_3$ Wavelength Filter", *Electronics Letters*, vol. 23, No. 11, May 7, 1987, pp. 572–574.

Noe et al, "Polarization mode dispersion compensation at 10, 20 and 40 Gb/s with various optical equalizers", date unknown.

Garoff et al, "Electroclinic Effect at the A–C Phase Change in a Chrial Smectic Liquid Crystal", *Physical Review Letters*, vol. 38, No. 15, Apr. 11, 1977, pp. 848–851.

Schlak et al, "Tunable TE/TM–Mode Converter on (001)–INP–Substrate", *16$^{th}$ European Conference on Optical Communication*, Sep. 16–20, 1990, vol. 1, pp. 309–312.

"Ferroelectric Liquid Crystals—Principles, Properties and Applications", vol. 7, in the series "Ferroelectricity and Related Phenomena", Editor George W. Taylor, Gordon and Breach Science Publishers, ISBN 2–88124–282–0, table of contents. 1991 (month unknown).

* cited by examiner

METHOD FOR COMPENSATING POLARIZATION MODE DISPERSION IN A WAVEGUIDE AND A POLARIZATION MODE DISPERSION COMPENSATOR

BACKGROUND OF THE INVENTION

The invention relates to a method for polarization mode dispersion compensation, and to a polarization mode dispersion compensator.

Optical waveguide transmission paths which are as long as possible are used in optical transmission technology. The optical waveguides are not completely isotropic owing to the way in which they are produced. As a result of the long transmission paths, birefringence of the optical signals which are transmitted results in frequency-dependent polarization transformation—referred to as polarization mode dispersion PMD, or polarization dispersion for short. As a result of the change in polarization and the different frequency-dependent propagation times resulting from this change, the change in propagation leads to transmitted pulses being broadened, which makes it harder to identify them at the receiving end, and thus limits the data rate which can be transmitted.

The polarization mode -dispersion is also dependent on the temperature or on mechanical stress. Adaptive PMD compensators are therefore required, which are inserted in the transmission path. The aim of a PMD compensator is to make the polarization transmission response of the overall system comprising the transmission path and the compensator approximately (to a first or, if required, even higher order) frequency-independent for at least one optical carrier frequency in the region of the transmission band. Modulated signals can thus be transmitted without distortion.

For wavelength division multiplexing WDM, it is desirable to achieve this frequency independence for the individual transmission bands (transmission wavelengths) at least in each of the individual channels. The requirements for such a transformer/compensator are low insertion loss, compatibility with optical waveguides, that is to say low coupling loss and mechanical compatibility, and a polarization behavior which is frequency-dependent and is as variable as possible.

PMD emulators whose adjustment can be varied but which are nevertheless low in price and low in attenuation, and which can simulate in a significant manner the frequency-dependent polarization transmission behavior of optical waveguide distances of lengths of up to several thousand kilometers and in widely differing conditions (for example with temperature fluctuations) are required in order to develop PMD compensators and in order to check the PMD tolerance of uncompensated transmission systems.

A "Transmission System and Receiver with Polarization Control" is known from Patent Application WO 95/34141, which uses an LiNBO₃ crystal whose XY plane runs transversely to the propagation direction Z. The propagation speeds in the X and Y axes are initially constant. However, they become slightly different by application of control voltages, so that the polarization can be varied. However, as a rule, polarization transformers are unsuitable for PMD compensation since, in this case, it is necessary to correct for major propagation time differences between the individual modes. These may amount to a duration of from approximately ⅓ of a bit up to several bits.

Compensators whose transmission characteristics are therefore the inverse of a transmission path are suitable to compensate for PMD. Compensators are known from the literature, which are in the form of retarders/polarization rotators and are arranged between relatively strongly birefringent pieces of optical waveguide. Retarder is a generic term for optical transmission elements which transmit two mutually orthogonal eigen modes but with phase delays which are in general different.

The strongly birefringent optical waveguide sections maintain or ensure two mutually orthogonal main polarizations and are thus polarization-maintaining optical waveguides PMF (polarization maintaining fibers). These PMFs are strongly polarization-dispersive, that is to say different polarizations lead to widely differing propagation times. An appropriate example is described in the proceedings of the "Optical Fiber Communication Conference", 1995, OFC'95, the Optical Society of America, as article WQ2 on pages 190 to 192.

An integrated optical single-sideband modulator and phase shifter is described in "IEEE Journal of Quantum Electronics", Volume 18, No. 4, April 1982, pages 767 to 771. This device contains, on a lithium-niobate substrate, a ground electrode which is in the form of a comb and is drawn over the chip, and electrodes which are in the form of combs, lie in a row and whose tines are interleaved with the tines of the ground electrode, and every alternate one of which is respectively connected to a first control voltage or a second control voltage, respectively. In this polarization transformer, the TE-TM mode conversion can be preset only with ±45° linear-polarized eigen modes, or with circular-polarized eigen modes. In this case, the TE-TM phase shift element is governed by the chip length and the chip temperature and cannot be varied by an electrical voltage. Another disadvantage of this arrangement is that a preset polarization transformation is effective for only one specific optical frequency, that is to say the frequency dependence of polarization transformers cannot be preset freely.

An integrated optical polarization transformer which uses lithium niobate LiNbO₃ or lithium tantalate LiTAO₃ as the substrate is described in "IEEE Journal of Quantum Electronics", Volume 25, No. 8, Aug. 8, 1989, pages 1898 to 1906. This requires only three different control voltages, one phase-shifter voltage and two mode-converter voltages in order to produce any desired polarization change. The phase-shift voltage produces a phase delay between TE (transverse electrical) and TM (transverse magnetic) waves, which are at the same time the eigen modes, but does not produce any conversion between them. One of the two mode-converter voltages produces TE-TM mode conversion with linear polarization at ±45° elevation angles as eigen modes, and the other produces TE-TM mode conversion with circular polarization as eigen modes. However, a predetermined polarization transformation is effective for only specific optical frequency. At other optical frequencies, the polarization transformation is dependent on the polarization transformation which is set for this specific optical frequency.

A TE-TM transformer with simple electrode shapes is described in the Proceedings of the Fourth European Conference on Integrated Optics ECIO 87, Glasgow, Scotland, Editors Wilkinson and Lamb, pages 115 to 118.

These known arrangements are used for polarization transformation, for example as polarization compensators and receivers. They are not planned for use as PMD compensators.

A method for PMD compensation is likewise described in Electronics Letters, Feb. 17, 1994, Volume 30, No. 4, pages 348 and 349. In this case, a number of sections of polarization-maintaining fibers (PMF) are used as transmission elements and are connected by means of polarization transformers, with a polarization transformer with a downstream polarization-maintaining fiber being used for PMD compensation. The attenuation which occurs may be very high owing to the spliced joints which are required.

The connection of a PMD compensator to an optical receiver and the process of obtaining a control criterion for setting the compensator are also described here. A functionally similar device has also been described on pages 258–259 of the Proceedings of the OEC'94 (Makuhari Exhibition, Japan), Article 14E-12, which achieves time differences between the modes of 28 ps.

In practice, the compensators described in the cited references are limited to very short sections of PMF. In consequence, when optimizing the control criterion, it is possible for a secondary optimum to be arrived at, so that the compensator is not set optimally.

A PMD compensator which comprises only PMFs is described in German patent application file reference 19816178.6. However, this requires mechanically moving parts.

SUMMARY OF THE INVENTION

The object of the present invention is thus to specify a method for PMD compensation and a PMD compensator which has numerous setting options and, within the transmission band in use, as far as possible allows desired frequency-dependent polarization transformation for the purpose of specific compensation.

The advantage of the PMD compensator according to the invention is that it can be used universally. The phenomenon of polarization mode dispersion, which is governed by a number of parameters, can in principle also be compensated for only by suitable adjustment options corresponding to a large number of degrees of freedom. The individual control voltages allow so many frequency-dependent polarization transformations to be set and carried out during operation that any required PMD for even those which are higher than first order, can be formed with very high accuracy, both for the purpose of PMD compensation and for PMD emulation.

Further advantages are the small physical size which is normal with integrated optical components, and the fact that the functions of polarization transformation and the production of different propagation times for different polarizations can be integrated on one component, a chip, in the PMD compensator according to the invention.

The PMD compensator can likewise be used as a PMD emulator or else as a polarization transformer.

Variants of the PMD compensator allow even more compact methods of construction.

The invention will be explained in more detail with reference to exemplary embodiments.

DESCRIPTION OF THE PREFERRED EMBODIMENTS

Figure 1:
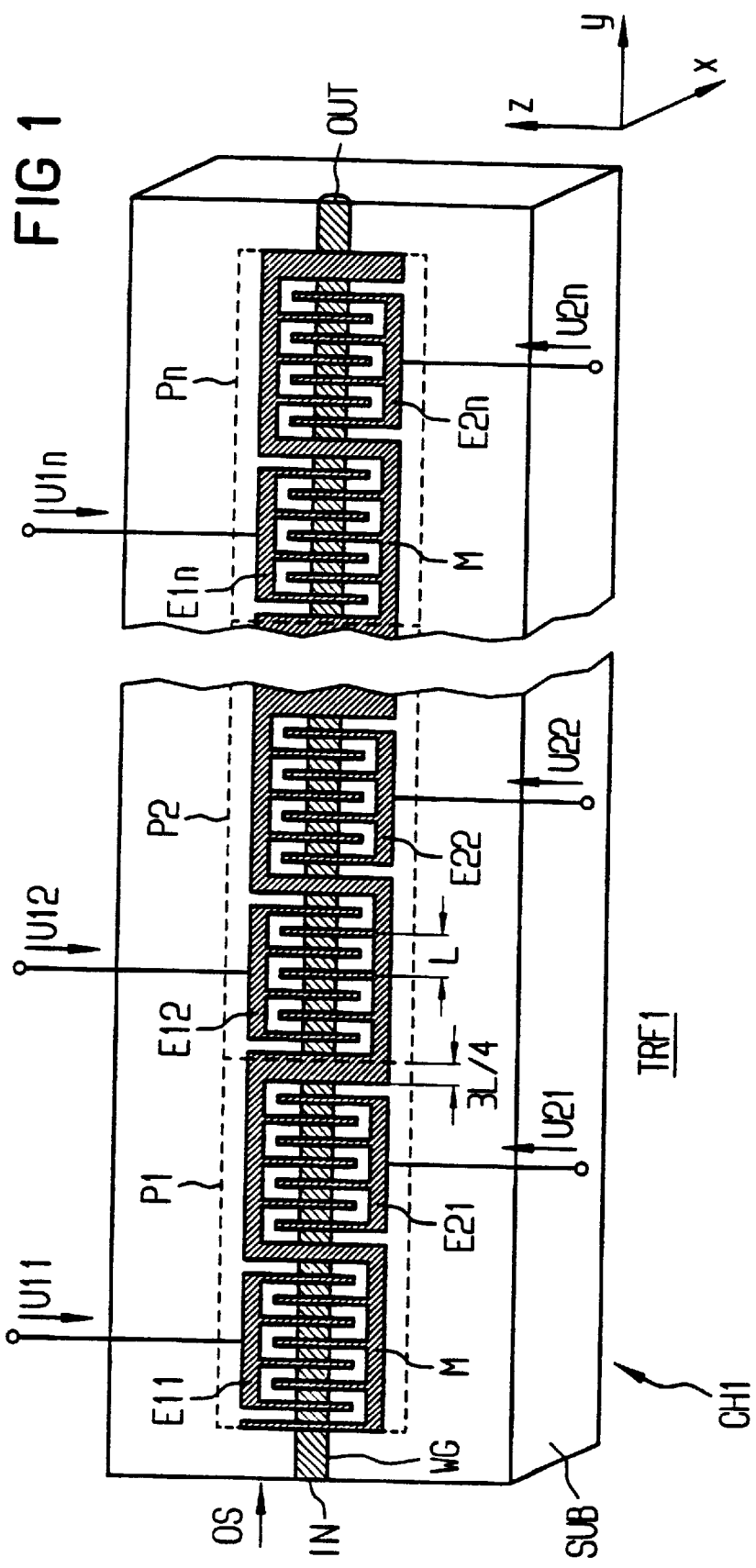
FIG. 1 shows the construction of a polarization mode dispersion compensator according to the invention.

FIG. 1 shows a PMD compensator TRF1 according to the invention. This is in the form of a chip CH1 with a lithium-niobate substrate SUB. Other possible materials are lithium tantalate or similar highly birefringent materials.

The crystallographic axes Y and Z lie in the plane of the drawing, while the crystallographic axis X points into the plane of the drawing. A waveguide WG is produced on the surface of the crystal by titanium diffusion. The waveguide WG is a monomode waveguide so that TE (transverse electrical) and TM (transverse magnetic) waves can propagate with a refractive-index difference of about 0.07.

Electrically conductive interdigital electrodes which are in the form of a comb whose tines (spur lines, fingers) are arranged transversely with respect to the waveguide are vapor-deposited on the surface of the substrate SUB. An electrode M with tines that are likewise arranged transversely with respect to the waveguide, runs in a meandering shape over the entire chip and can be connected to ground to form a ground electrode. The other mode converter electrodes Eij (i=1,2; j=1,2 . . . n) which are in the form of combs, are electrically isolated from one another. A voltage Uij on one electrode produces an electric field in the waveguide WG, which runs periodically in the propagation direction Y, or in the opposite direction to this. Directly underneath the electrodes, it runs periodically in the direction X, or in the opposite direction to this. The optical wave, or the optical signal OS passes through the chip from the input IN to the output OUT. The period length L between the individual electrode tines is chosen to be approximately equal to a beat wavelength between the TE and TM waves. A beat wavelength is that length for which the retarder with TE and TM waves as eigen modes has a phase delay of precisely 360° between these eigen modes. With mixed polarizations, this is therefore repeated periodically at intervals of multiples of a beat wavelength. For an optical wavelength of 1550 nm (nanometers), the beat wavelength in lithium niobate corresponds to approximately 21 μm. The tine width (finger width) and the electrode separations are therefore expediently each chosen to be approximately equal to L/4. This results in a uniform structure in which tine widths and intermediate spaces are of equal size. In order to allow TE-TM conversion with a variable phase to be carried out, additional intervals of alternately about L/4 and 3L/4 are in each case provided after a number of tine periods. This results in phase delays between TE and TM waves of 90° and 270°, respectively—the latter of which cancels out the former once again—thus resulting in TE/TM conversion with a different phase angle. This will now be explained in more detail: when there is a pure TE wave at the input of the PMD compensator, or of a part of it, this results in a pure TE wave at the output, provided there are no control voltages on the electrodes. For suitably selected actuation voltages, the TE wave on the input side is converted into a pure TM wave. If these actuation voltages are reduced, then this results in a mixture of TE and TM waves at the output, whose phase difference is freely variable. In particular, actuation voltage levels of about half result in an output polarization state which can be varied between 45° linear, right-hand circular, −45° linear, left-hand circular, and 45° linear once again. The ground electrode M in each case has an overall width of approximately L/2 or L at these points (the ground electrode between the mode electrodes and cells could in principle also be made narrower, or could be replaced by bonding wires).

At least two mode converter electrodes, E1j and E2j (j=1,2 . . . n), including the associated ground electrode segment interleaved in electrodes E1j and E2j, may be formed into cells Pj. A cell may likewise—like a mode converter electrode—be formed into a mode converter. If the mode-converter electrodes have positions differing by modulo half the beat wavelength of the substrate material, this is then a mode converter in which not only the intensity and mathematical sign, but also the phase of the mode conversion can be selected. In the case of cells formed with two electrodes, these can be actuated using a pair of control voltages which are dependent on two parameters. The exemplary embodiments are limited to cells of this type. However, in principle, cells of different size with different electrodes and/or different numbers of electrodes, or different arrangements of the mode-converter electrodes, are possible. Each polarization transformer produced in the birefringent substrate material may be a cell.

In the exemplary embodiment, n cells are provided, with values from about 25 to 50 being realistic for the number n. The voltages on the electrodes E1j and E2j of the cells are, however, not in each case identical or, as described in the Proceedings of the 4th European Conference on Integrated Optics (ECIO '87), Glasgow, UK, May 11–13 1987, pages 115–118, variable sinusoidally as a function of the longitudinal position coordinate, but are freely variable, individually or in groups.

Freely variable in groups means the following: for example, electrode voltages of U1j, U1(j+1), U1(j+2), . . . to U1(j+9), (j=1, 11, 21, . . . ) may be identical, in the same way as the electrode voltages U2j, U2(j+1), U2(j+2), . . . to U2(j+9), (j=1, 11, 21, . . . ). Thus, in this example, the type E1j electrodes are supplied with the same voltage by ten adjacent cells in each case, and, in the same way, the type E2j electrodes are each supplied by ten adjacent cells. This can easily be achieved by means of conductive connections between the electrodes. The variability of the PMD compensator is limited by the withstand voltage of the spaces between the electrodes. Ideally, it should be possible to carry out polarization transformations over an indefinitely short length, but this would necessitate correspondingly high voltages. Attention must therefore be paid to a high withstand voltage during production. This can be done, for example, by applying insulating layers to the crystal surface.

While, in the prior art, only one polarization transformation, which has two degrees of freedom, can be specified for one optical frequency by two variable mode-converter voltages or mode-converter voltage parameters, while the polarization transformations for all other optical frequencies result from this, the invention means that, by cascading a number of mode-converter electrodes, cell or cell groups which can be actuated individually or on a group-specific basis with, in general, in each case two variable mode-converter voltages, polarization transformations can be redetermined independently of one another within wide limits for a number of optical frequencies. This also applies to the other exemplary embodiments of the invention, with in each case three actuation voltages, instead of two, and thus three degrees of freedom being provided per cell in the example illustrated in FIG. 3. In that example, the additional degree of freedom does not, however, relate to the mode conversion but to a differential phase shift. The latter can be used to select the operating wavelength. It also influences the PMD which is produced or compensated for, of course, but the PMD changes which can be achieved in the vicinity of an optimally set operating wavelength as a result of the differential phase shift can, in general, also be achieved by actuation of the mode-converter electrodes. One major reason for also using differential phase shifting is thus matching of the PMD compensator to the desired operating wavelength.

A single mode converter, which is formed in a birefringent substrate material and whose mode-conversion phase can be set by means of two parameters to be in phase or in quadrature, can favorably influence, or even compensate for, PMD only in special cases. It is not suitable for technically worthwhile PMD compensation.

However, according to the invention, at least one further mode converter is added, which has at least one further control voltage, in which case the total of at least three control voltages used for mode conversion in all the mode converters which are used are governed by at least three parameters. In the simplest case, the parameters are identical to the control voltages being used. The sensible minimum number of control voltages is 4 to 6 thus covering, for example, at least two cells each having two mode-converter electrodes. Expedient refinements operate with at least 10 different control voltages.

Figure 2:
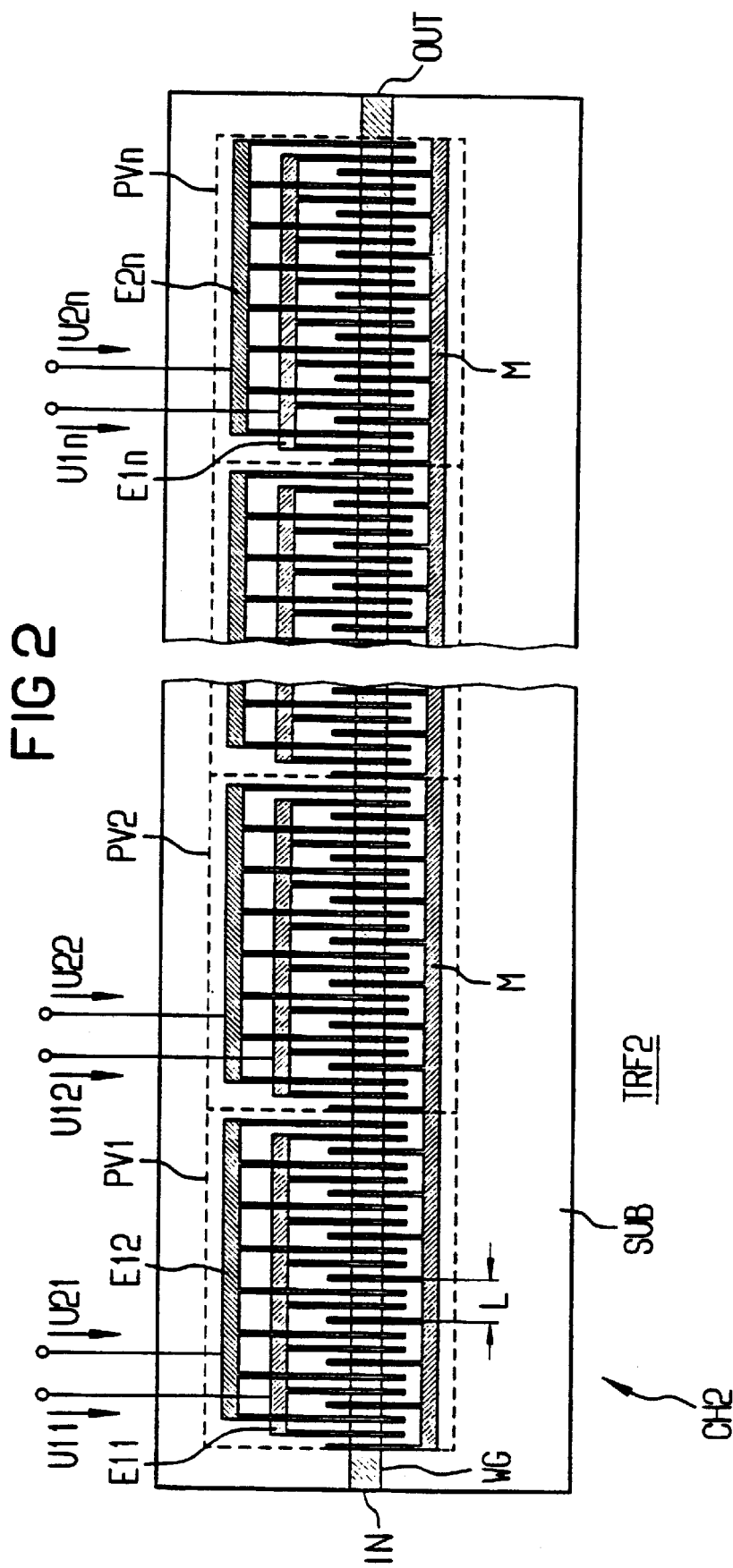
FIG. 2 shows a variant with crossing electrical lines.

If one is prepared to accept complicated wiring on the chip, for example using electrical lines that cross over, then the variant TRF2 shown in FIG. 2 can be produced by means of insulating intermediate layers. The tines of the mode electrodes E11 and E12; E21 and E22, . . . to En1 and En2 are in this case each located successively between two tines of the ground electrode M. For the same maximum strength of the longitudinal electric field, this variant can carry out polarization transformations over a somewhat shorter distance than the PMD compensator shown in FIG. 1, and thus offers greater variability for polarization transformation, with the chip CH2 having the same overall length. The periodicity of the electrode tines is still L. Their width and separations are approximately L/6. There is no need to introduce any greater separations or widths for the ground electrode.

Figure 3:
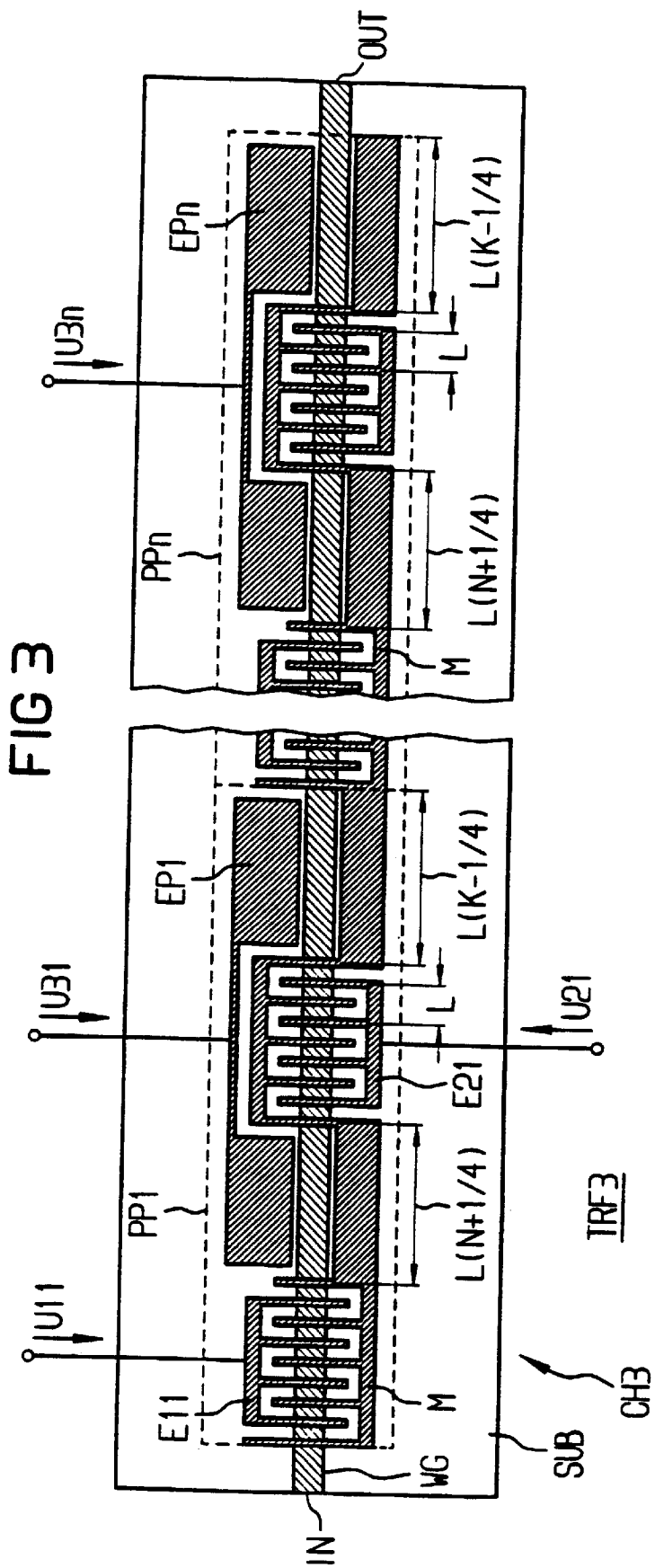
FIG. 3 shows a variant with electric fields running at right angles to the waveguide direction.

A further exemplary embodiment TRF3 of the transformer is shown in FIG. 3. It may also be advantageous to introduce a transverse-electrical/transverse-magnetic phase shift, as is known from "IEEE Journal of Quantum Electronics", Volume 25, No. 8, pages 1898 to 1906, by means of electric fields running at right angles to the waveguide along the crystallographic Z-axis. The elliptical polarization transformation which can be achieved in this way, is characterized by having three degrees of freedom, can produce a control response that can be coped with somewhat more easily for compensation of PMD and, above all and as already mentioned, allows the PMD compensator to be matched to the desired operating wavelength is advantageous, while the disadvantage, on the other hand, is the lower electrooptical coefficients, which allow only smaller phase shifts. The cells PPj (j=1,2, . . . n) on the chip CH3 likewise contain mode-converter electrodes E11, E21, . . . , which are actuated with voltages U11, U21, . . . Phase-shifter electrodes EP1, . . . , which are actuated by voltages U3j (j=1, 2 . . . n) are arranged between the mode-converter electrodes. These can be chosen freely individually or individually in groups, that is to say, for example, the voltages U3j, U3(j+1), U3(j+2), . . . to U3(j+9), (j=1, 11, 21, . . . ) of the groups identified by different indices j can be chosen to be identical within each group. The phase-shifter sections of the phase-shifter electrodes have different lengths which are each a quarter of a beat wavelength greater or less than an integer multiple of the beat wavelength, that is to say L(N+¼) or L(K−¼) N, K=1, 2, 3, . . . In this way, as in FIG. 1, the electrodes, which are in the form of combs, form two groups E11 to E1n and E21 to E2n, which each produce TE-TM conversion with the same phase. Thus, if necessary, a number of voltages which are applied to a group of electrodes in adjacent cells, that is to say, for example, U1,1 to U1,10, U1,11 to U1,20, . . . , that is to say U1j to U1(j+9), j=1, 11, 21, . . . ) may once again be identical, in the same way as the voltages U2j to U2(j+9), (j=1, 11, 21, . . . ). If one wishes to exploit this advantage, all the electrodes can be actuated individually, as is also possible in FIG. 1 or 2.

In integrated optics, a change between different crystal cuts and materials is normal in all cases. For example, IEEE J. Lightwave Technology, LT-5, No. 9, 1987, pages 1229–1238 describes, in FIG. 3 there, how an integrated-optical component, in this case a modulator, can be produced equally well with an X-cut and with a Z-cut. In that example, the electrode configuration is changed on the transition from the Z-cut to the X-cut since, furthermore, the same electrooptical coefficient is intended to be used, and the electric field is therefore intended to run along the same crystal axis, in that example the Z-axis.

Figure 7:
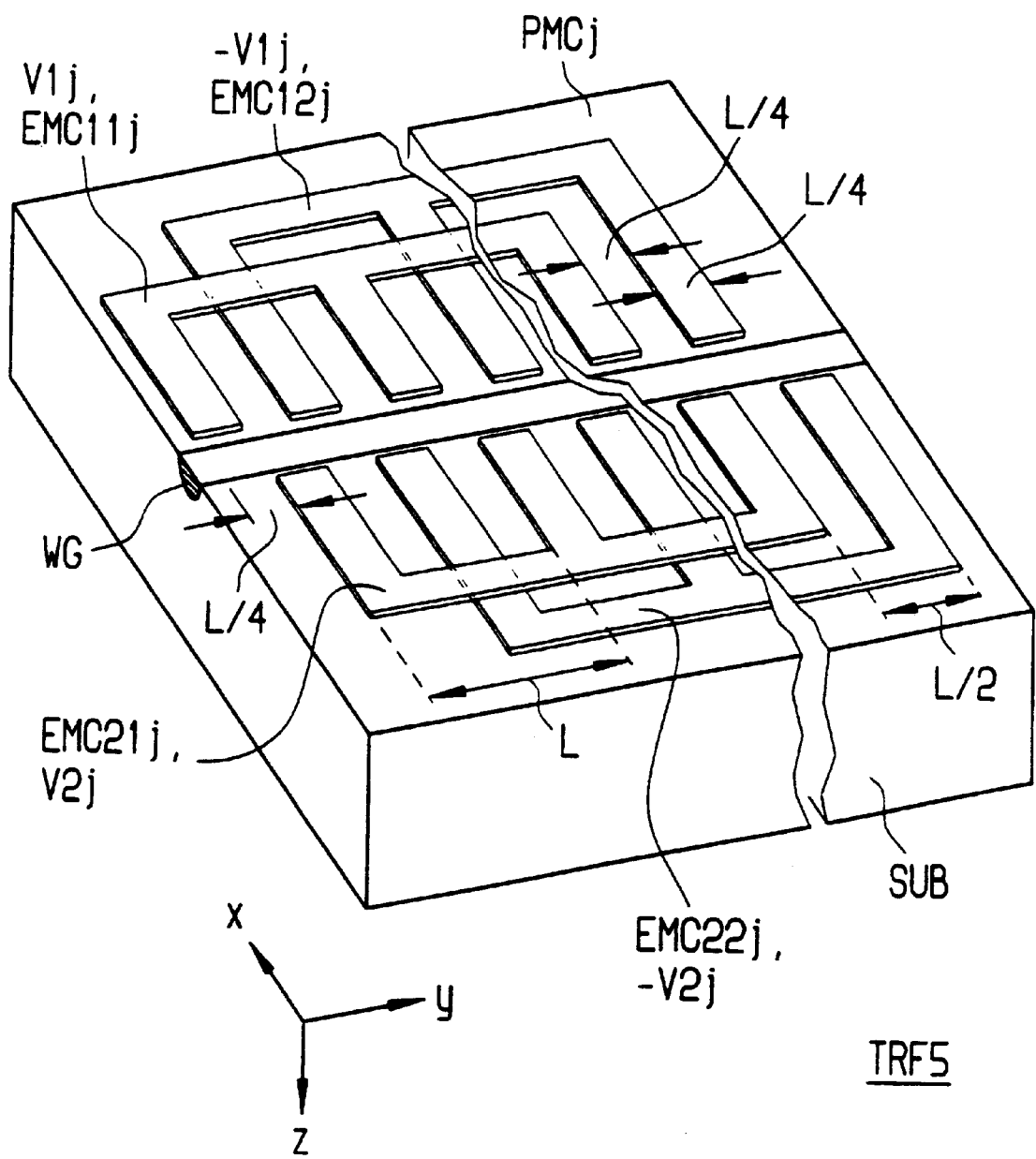
FIG. 7 shows a variant of a polarization mode dispersion compensator according to the invention, with a different crystal cut.

The exemplary embodiments in FIGS. 1 to 3 can also be modified in an analogous manner to that shown in FIG. 7. In FIGS. 1 to 3, mode converters are intended to carry out mode conversion between Z and X-polarization. In lithium niobate, this is done using the electrooptical coefficient r51 by means of a quasi-static electric field in the X-direction which is periodic at the beat wavelength L of the birefringent waveguide WG. Thus, while FIGS. 1 to 3 can be produced, for example, using lithium niobate with an X-cut and a Y-propagation direction, the exemplary embodiment TRF5 in FIG. 7 can be implemented, for example, using lithium niobate with a Z-cut and a Y-propagation direction. This crystal-axis orientation is shown in FIG. 7. While, in FIGS. 1 to 3, the periodic electric fields that are at right angles to the plane of the drawing, that is to say running along the X-axis, produce mode conversion between the X-axis and the Z-axis, in FIG. 7 these are the periodic electric fields which run transversely with respect to the waveguide WG in the plane of the drawing, that is say once again running along the X-axis. FIG. 7 shows a suitable arrangement, as a detail. of the substrate SUB. The illustration shows a mode converter PMCj (j=1 . . . n) which, for group-specific actuation, is part of a larger mode converter. Electrodes EMC11j, EMC12j, EMC21j, EMC22j (j=1 . . . n) in the form of combs are fitted on each side of the waveguide WG. The electrodes EMC11j, EMC21j, EMC12j, EMC22j end transversely approximately at the edges of the waveguide WG in order to achieve as large as possible an overlap integral of optical and electric fields. The normal insulating buffer layers, for example of SiO$_2$, can be applied between the chip surface and the electrodes to provide the required insulation between crossing electrodes. The mode-converter voltages V1j or −V1j, respectively, is applied to the electrode EMC11j, EMC12j, on one side. The voltages V2j and −V2j are applied to the electrodes EMC21j, EMC22j on the other side. With respect to the electrodes on the first-mentioned side, these are offset through a quarter L/4 of one beat wavelength L of the birefringent crystal SUB in the propagation direction Y. At intervals other than L/4, V1j and V2j are not at 90°, but produce mode conversions offset at corresponding different phase angles to one another. The electrode separations on one side of the waveguide and the electrode width are also approximately L/4. The two electrodes in the form of combs on each side are isolated from one another by an insulating intermediate layer at the crossing points, each have periods of one beat wavelength L, and are offset with respect to one another through half L/2 a beat wavelength L. Mode conversion can be carried out in phase or at 90° by mode-converter voltages V1j and V2j and the inverted voltages −V1j, −V2j that are dependent on them (that is to say voltages which are actually inverted with respect to the voltages V1j and V2j), thus allowing endless polarization transformation, and endless phase shifting of signals whose mode has been converted.

Figure 8:
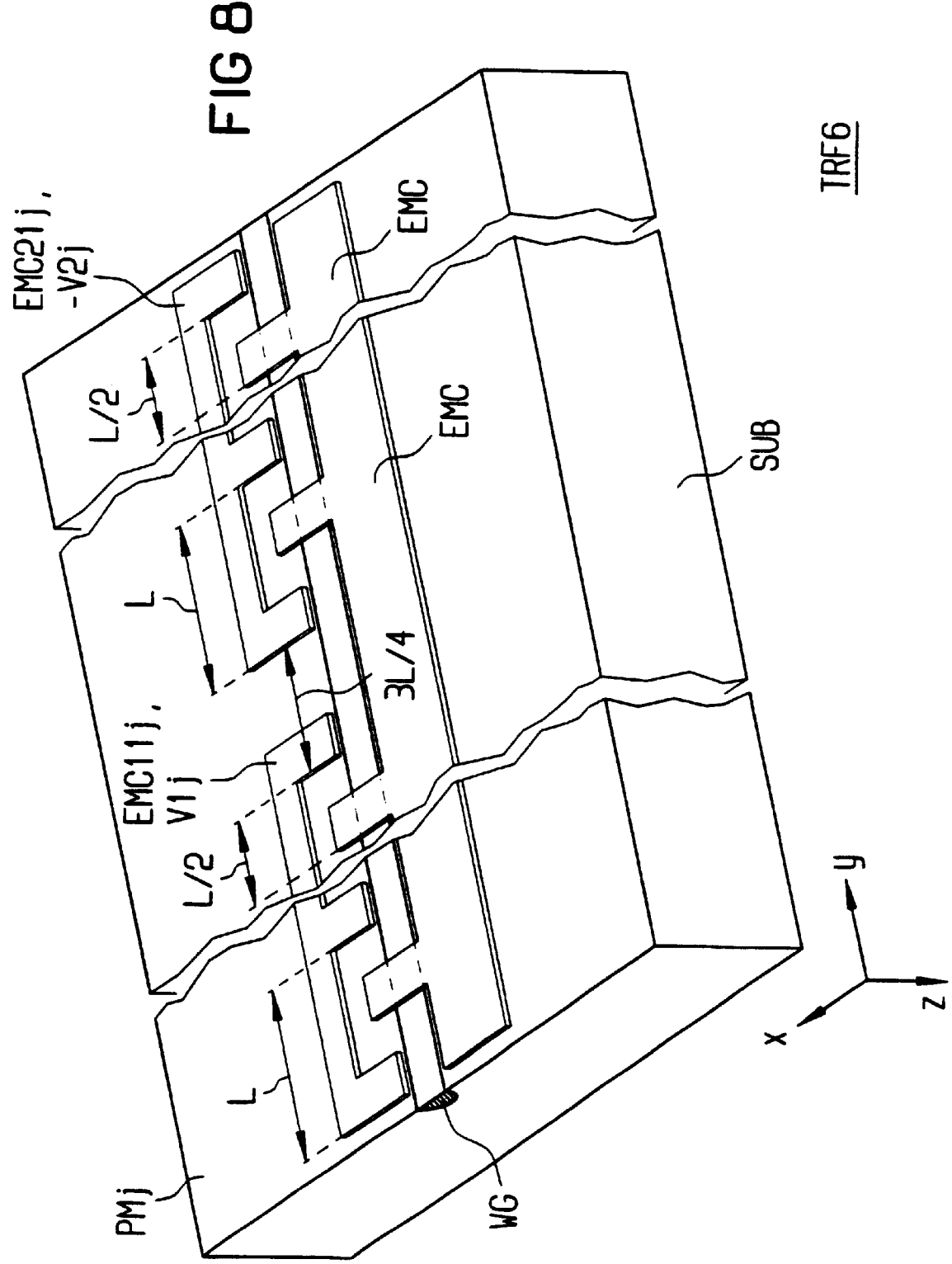
FIG. 8 shows a further variant without any electrode crossings.
Figure 9:
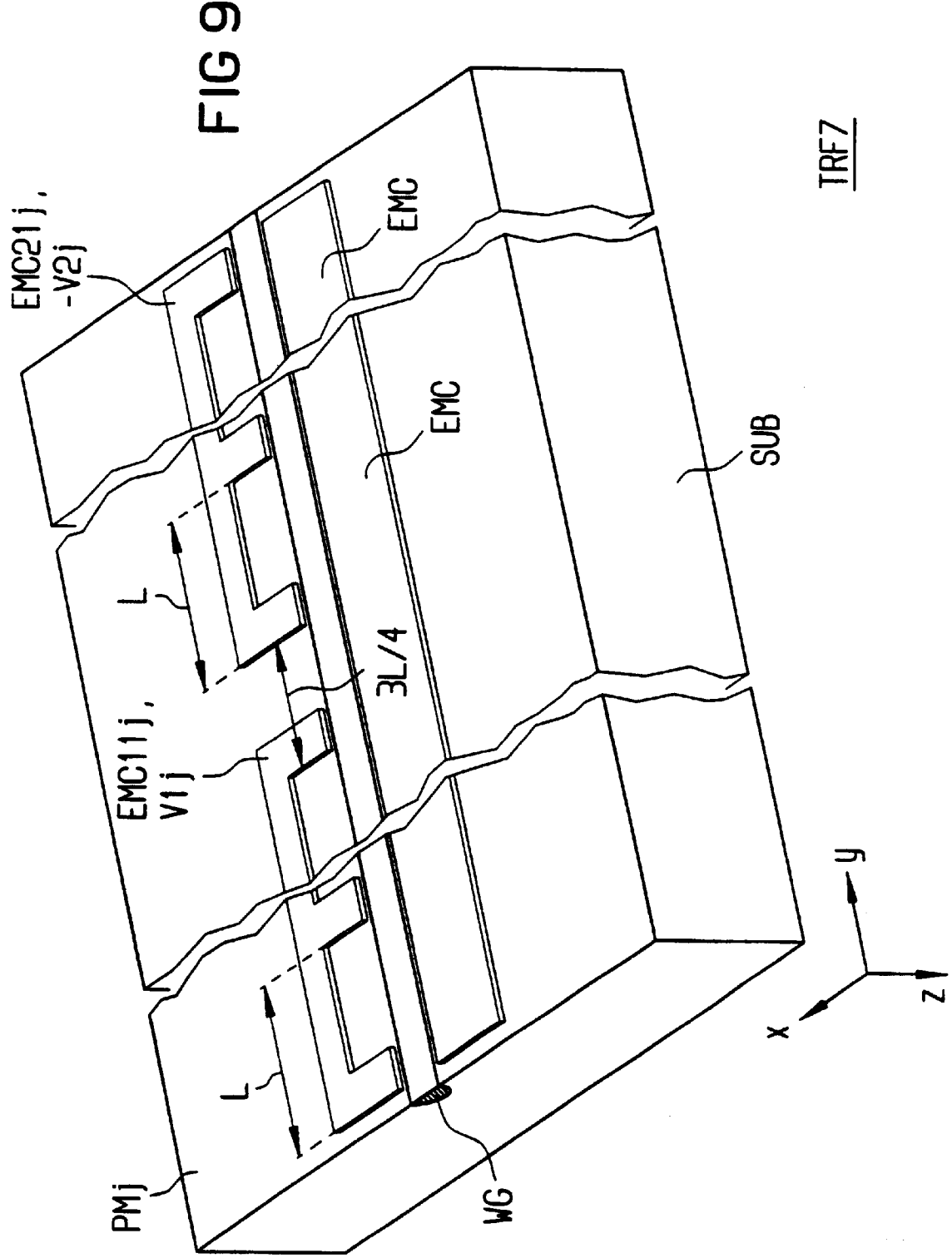
FIG. 9 shows a variant with a ground electrode without tines.

In another exemplary embodiment TRF6 illustrated in FIG. 8, one of the mode-converter electrodes on one side of the waveguide is omitted. On the other side, both electrodes are replaced by a ground electrode EMC. In order to improve the efficiency, the electrode EMC may, but need not, have tabs which overlap the waveguide (FIG. 9, TRF7). The arrangement has the advantage that the remaining electrodes EMC11j, EMC21j, EMC do not cross. This exemplary embodiment of a mode converter PMj (j=1 . . . n) likewise allows mode conversion in both quadratures, but only owing to the fact that a second mode-converter electrode EMC21j with a voltage V2j is provided alongside a first mode-converter electrode EMC11j with a voltage V1j. The two electrodes are applied on a chip SUB, offset with respect to one another through an odd multiple 3L/4 of one quarter L/4 of a beat wavelength L in the propagation direction Y. High mode-conversion levels, which are freely variable in phase and in quadrature, are achieved by using a number, or a large number, of mode converters PMj (j=1 . . . n) preferably at intervals of an integer (or else half-integer) multiple of the beat wavelength L as the distance between an electrode EMC11j and the corresponding electrode EMC11(j+1) of the next mode converter PM(j+1). This cascading is implemented in an analogous manner to that in FIG. 1.

A greater bandwidth than in lithium niobate, but with a reduced PMD compensation capability, can be achieved, for example, by using lithium tantalate, which is less birefringent and, accordingly, has a longer beat wavelength L.

An alternative embodiment of mode converters, which is similar to the embodiment in FIGS. 7 and 8 but can be used specifically for III/V semiconductors such as GaAs and InP, is described in the proceedings of the European Conference on Integrated Optics ECIO 1987, Glasgow, May 11–13, 1987, pages 115–118 and in the Proceedings of the European Conference on Optical Communications 1990, pages 309–312. Optical amplifiers can also be provided in III/V semiconductors. This has the advantage that the attenuation of the PMD compensator can be compensated for once again on the chip itself. It could be regarded as a disadvantage that the gain in III/V semiconductors is generally dependent on the polarization. However it is possible, for example by means of differently biased quantum wells, to form amplifiers which amplify TE to a greater extent than TM, or vice versa. Amplification independent of the polarization can thus be achieved by cascading two opposite amplifiers, whose respective gain can be controlled by a pumping current. Since the attenuation in III/V materials is also more strongly polarization-dependent than, for example, in lithium niobate, that polarization dependence can be corrected by means of opposite polarization dependence in the optical amplifier or amplifiers which is or are installed.

Figure 10:
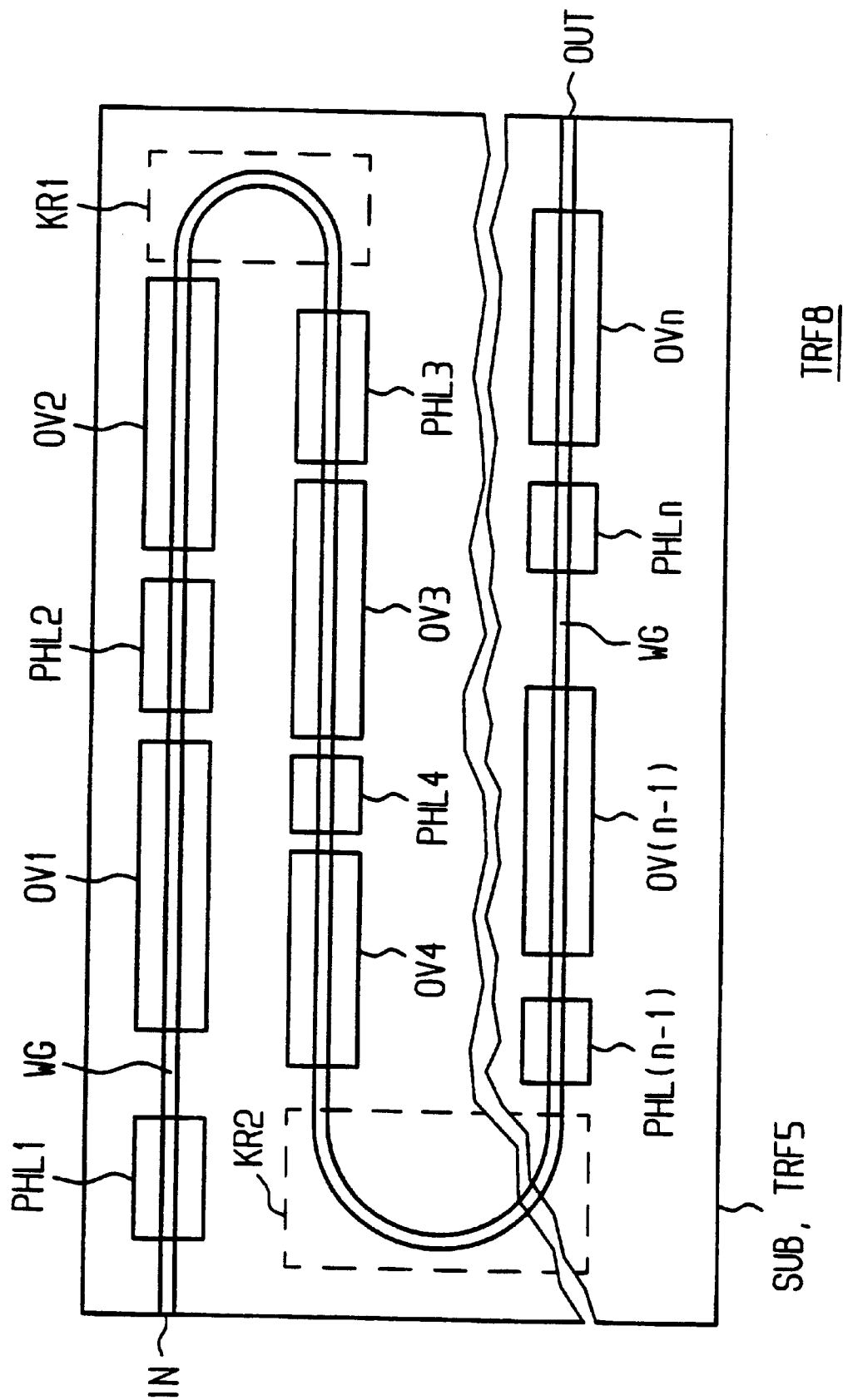
FIG. 10 shows a variant with optical amplifiers.
Figure 11:
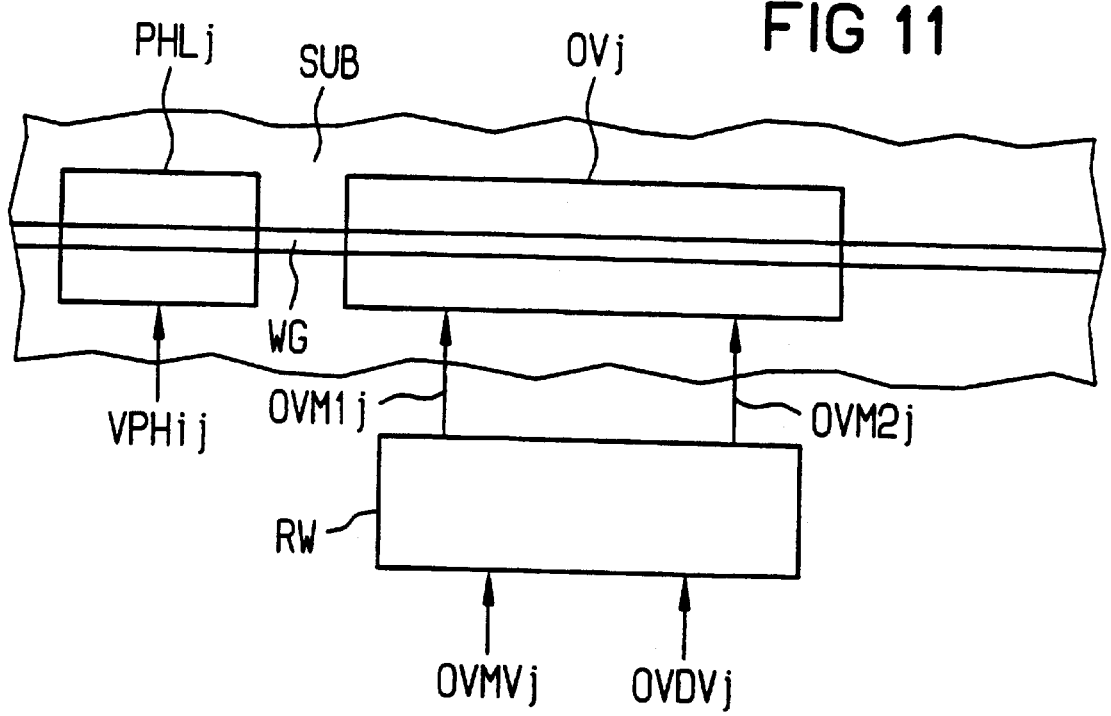
FIG. 11 shows a detail of an amplifier and adjacent mode converter of FIG. 10.

Polarization-dependent losses PDL also occur on optical transmission paths. These result, for example, from polarization-dependent isolators or couplers. If PDL occurs in the presence of PMD, then this results in additional losses during transmission. In one specific examplary embodiment of a polarization mode dispersion compensator TRF8 as shown in FIG. 10, optical amplifiers OVj (j=1 ... n) are thus also provided on the substrate SUB as well as mode converters PHLj (j=1 ... n). As a detail from FIG. 10, FIG. 11 shows a specific mode converter PHLj and an upstream or downstream optical amplifier OVj. The former receives control signals VPHLij (j=1 ... n; i=1 ... f). The index i, with a maximum value f, relates to the number of mode converter control signals which are available in each mode-converter PHLj. The latter receive pumping signals OVMpj (p=1 ... 2; j=1 ... n).

The pumping signal connections OVM1j result in the TE gain being influenced more strongly, and the pumping signal connections OVM2j result in the TM gain being influenced more strongly. The signals OVM1j, OVM2j can thus be produced by suitable combinations, for example linear combinations, of signals OVMVj, OVDVj, one of which OVMVj at least approximately influences only the mean gain, and the other, OVDVj, at least approximately influences only the differential TE-TM gain. As shown in FIG. 11, these combinations can be formed in an arithmetic unit RW which is produced, for example, from resistors and operational amplifiers, or is in the form of a microprocessor program. According to the invention, by varying the signals OVDVj in addition to the mode-converter signals VPHij, of the mode converters PHLj, it is possible to compensate not only the PMD, but also for any PDL which is present, at the same time.

Figure 4:
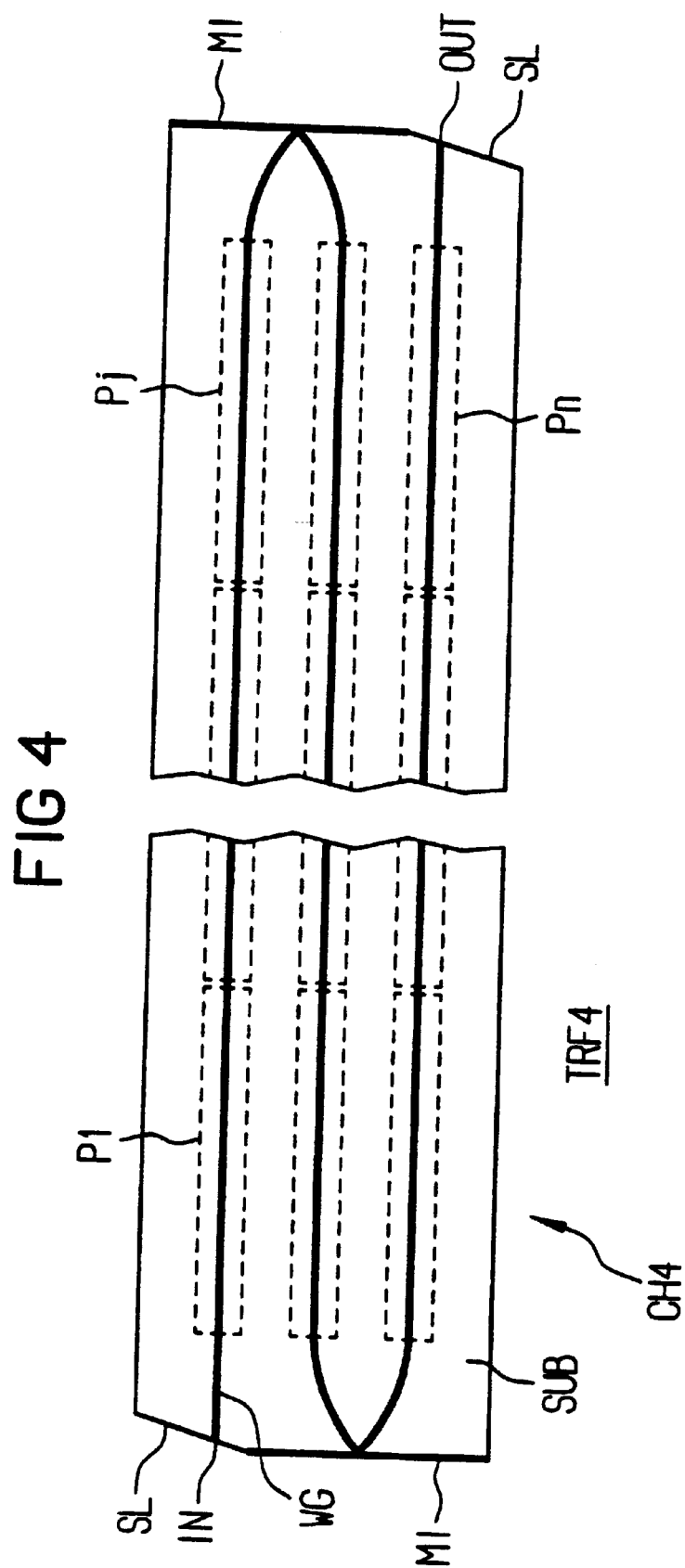
FIG. 4 shows a variant with a folded beam path.

In this exemplary embodiment, instead of the reflectors shown in FIG. 4, in FIG. 10, bends KR1, KR2 can be provided in the waveguide WG, for beam deflection. As described on pages 654 and 655 of Electronics Letters, Apr. 15, 1999, Volume 35, No. 8, such bends can be provided by means of photonic band-gap materials.

In general, the compensation for or production of PDL together with the compensation for or emulation of PMD is not just limited to semiconductor materials or to materials with optical amplifiers. Even in passive materials such as lithium niobate, dichroic elements OVj, such as all polarization-dependent couplers whose coupling can be varied electrooptically, or polarization-dependent interferometers, can be used such that the difference between the attenuation levels of specific waves which are polarized orthogonally with respect to one another, in particular TE and TM, can be adjusted by means of control signals OVDVj. In this case, FIG. 10 also shows a block diagram of such exemplary embodiments of the invention.

FIG. 4 shows an exemplary embodiment TRF4 of the PMD compensator with a folded beam path in the waveguide WG. The ends of a chip CH4 are provided with metallic or dielectric mirrors MI. Shortly before arrival at a mirror, the waveguide WG is bent, thus resulting in reflection and feeding into the next section in as ideal a manner as possible. The mirror system can be replaced by couplers in whose center the mirror is located. This reduces the requirements for the accuracy of the longitudinal position of the mirrors MI, but results in stronger undesired reflections if not manufactured exactly.

In the region of the input IN and of the output OUT, the waveguide ends are cut off at an angle of, for example, 6° to 8°, thus making it possible to produce a very low-reflection junction between the waveguide WG and an external quartz-glass waveguide. The angled cut could also be used for the chips in FIGS. 1 to 3. Other low-reflection junctions such as dielectric dereflection, are also possible. The individual cells P1, P2, Pj, Pn can be configured as shown in FIGS. 1 to 3.

It should also be stated that it is also possible to vary the transformation response by varying the temperature of the chip. If this effect is undesirable, the temperature of the chip must thus be kept constant, or must be taken into account by inclusion in a control system.

Figure 5:
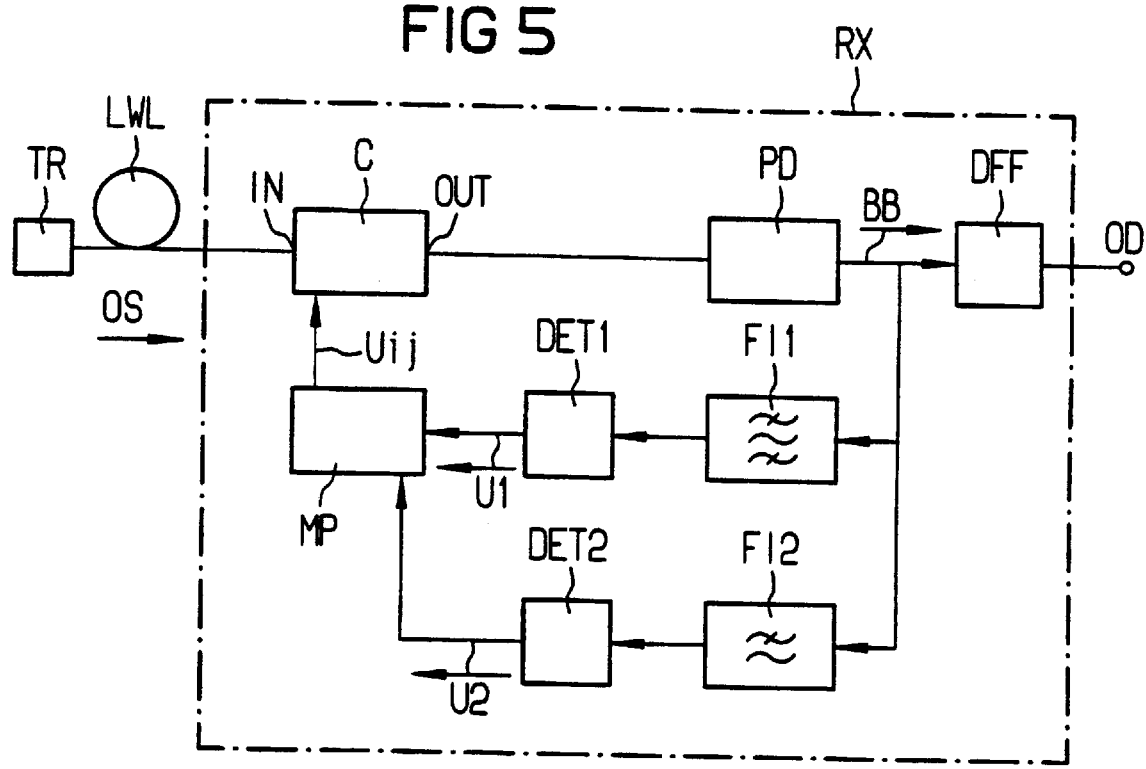
FIG. 5 shows an adaptive compensator.

FIG. 5 shows the use of an adaptive PMD compensator C. The illustration shows a transmission path with an optical transmitter TR, a transmission path provided by an optical waveguide LWL, and an optical receiver RX. The receiver contains a photodiode PD, followed by a decision maker DFF. The transmitted data signal is emitted at the output OD of the decision maker.

The PMD compensator C to compensate for the polarization mode dispersion of the optical signal OS is positioned upstream of the photodiode. Further details, such as amplifiers, have been omitted for reasons of clarity.

The control criterion is obtained, for example, from the baseband signal BB emitted at the output of the photodiode. This is done, for example, via a filter FI1, which is in the form of a bandpass filter with a resonant frequency at about half the symbol rate of the transmitted (binary) data. This is expedient if the maximum PMD values that occur are less than one symbol period of the data signal. Alternatively, the filter may be in the form of a low-pass filter whose cut-off frequency is approximately ⅒ to ¼ of the symbol rate. This allows even relatively large PMD values to be detected clearly. The filter is followed by a first detector DET1, for example a rectifier. The detector output voltage U1 obtained in this way is supplied to a regulator MP, preferably a microprocessor with an analog/digital and digital/analog converters, and operational amplifiers for actuating the PMD compensator C.

In order to allow both small and large PMD values to be detected clearly, further filters and detectors FI2 and DET2 may also be provided.

When using the bandpass filter, the output voltage U1 is at a maximum when the eye opening of the baseband signal BB is a maximum. This corresponds to undistorted optimum transmission. If the eye opening of the baseband signal is a maximum, the detector output voltage U2 is also a maximum when a low-pass filter is used.

The output signals from the regulator are the voltages Uij (i=1, 2, 3; j=1, 2, ... n) which the PMD compensator requires. The regulator MP varies the voltages Uij individually or in groups. The voltages which are retained are those which allow the greatest possible detector output voltages to be achieved. This allows the PMD compensator to provide optimum compensation for the polarization mode dispersion on the transmission path.

Figure 6:
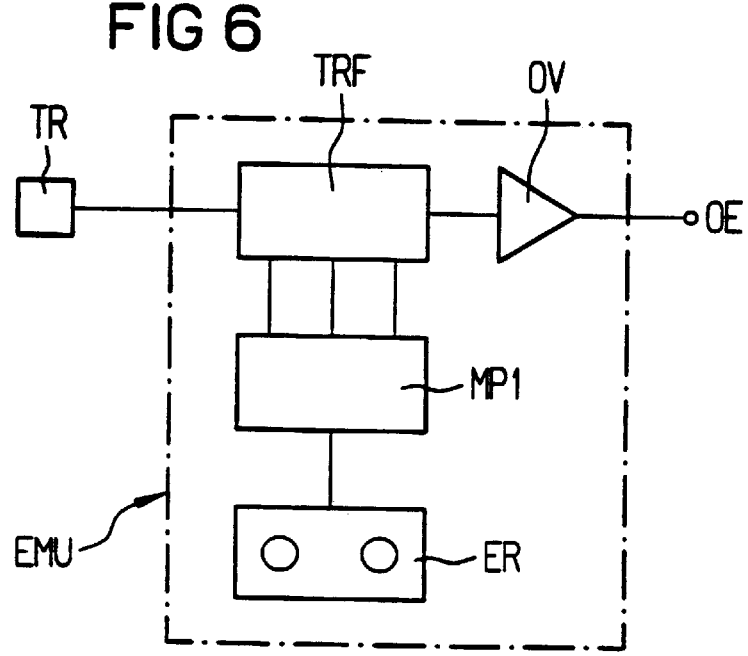
FIG. 6 shows an emulator.

FIG. 6 shows the use of the PMD compensator as an emulator EMU. A microprocessor MP1 receives signals via an adjustment device ER, and converts them into corresponding control voltages Uij. In a simple version, the control voltages Uij could also be set by means of a potentiometer.

The optical signals fed in by the transmitter TR are emitted in transformed form at the output OE of an amplifier OV. The latter may also be omitted.

Apart from the materials lithium niobate, lithium tantalate and III/V semiconductors which have been mentioned, there are also a large number of other possible ways to produce PMD compensators on a chip or substrate SUB. The chip/substrate may be birefringent, so that the waveguide WG is birefringent, although the chip/substrate may also be non-birefringent (isotropic), provided the waveguide WG itself is composed of birefringent material.

For example, the waveguide WG may be composed of a liquid crystal, or a liquid or solid polymer. To produce it, a waveguide channel is formed out in a substrate material. If necessary, initial orientation of these waveguide materials is produced by electric fields.

Figure 12:
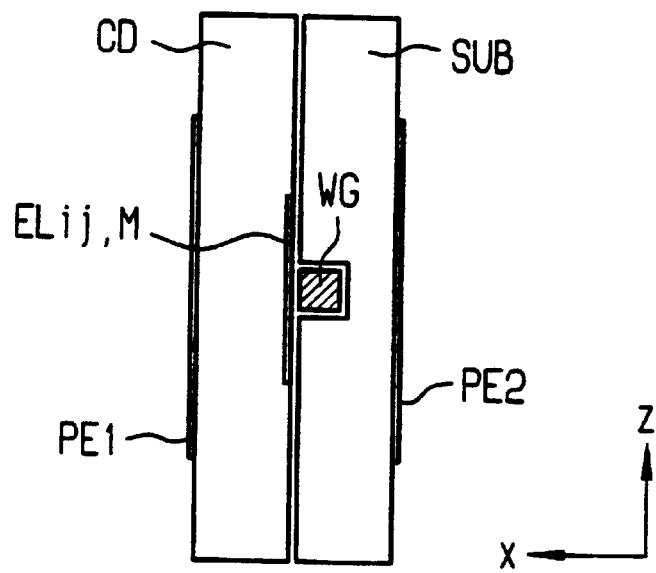
FIG. 12 shows a section view with a waveguide embedded in a substrate.

The exemplary embodiment in FIG. 12 shows a chip/substrate SUB, preferably composed of polymer, with a cover plate CD placed on it, in a cross-section from one end surface. The crystal axes X and Z of the waveguide WG lie in corresponding directions to those in FIGS. 1 to 3; the latter figures show a plan view of the exemplary embodiment as in FIG. 1 looking through the substrate cover CD. In other embodiments, for example as shown in FIGS. 7 to 10, the crystal axes may also lie in different directions. The cover plate CD may also be composed of polymer; however it is also feasible to use materials such as quartz glass (silicon dioxide) and silicon or other materials with low optical attenuation for the substrate and cover plate.

The manufacture of waveguide and V-grooves for optical waveguide coupling by means of hard dies which are pressed into polymers is cited on pages 1396 to 1398 of Electronics Letters, Jul. 9, 1998, Volume 34, No. 14, and in the references mentioned there.

Solid polymers with a good electrooptical coefficient r33 are mentioned in the proceedings of the 24th European Conference of Optical Communications, Madrid, Sep. 20 to 24, 1998, pages 501 to 502. However, different electrooptical coefficients are required for the application required here.

In a further exemplary embodiment, as shown in FIG. 12, the waveguide WG consists of a ferroelectric liquid crystal, which is birefringent. The waveguide is incorporated in a cutout on the surface of the polymer substrate. The cutout can be produced by a metal die during manufacture of the substrate, or afterwards. Electrodes ELij, M are applied to the cover plate, for example by vapor-deposition. If a considerable proportion of the optical field is transmitted into the electrodes, as is the case in the drawing, an optically low-loss material such as indium-tin oxide (ITO) must be used for the electrodes. The electrodes also have supply lines, so that an external voltage can be applied to them.

The ferroelectric liquid crystal is oriented such that, when no electric fields are applied between the electrodes, it has a different refractive index for transverse electromagnetic fields in the Z-direction (in the plane of the drawing in the right-hand part of the illustration) than in the X-direction (see the left-hand part of the illustration). However, electrostatic field components in the Y-direction change the major axes of the birefringence. The change in the angle of the major axes is referred to as the tilt angle. In the case of Clark-Lagerwall switches, this can be varied to a major extent but not without hysteresis, in the case of deformed-helix ferroelectric liquid crystals (DH-FLC), it can likewise be varied to a major extent, and in the case of electroclinic liquid crystals (electroclinic FLC) it can be varied to a lesser extent, but relatively quickly. Electroclinic and DH-FLC appear to the most suitable candidates for this component.

The electroclinic effect is described, for example, in Physical Review Letters, Volume 38, 1977, from page 848. The deformed-helix ferroelectric effect is described in Liquid Crystals, Volume 5, 1989, from page 1171. A broad overview of ferroelectric liquid crystals can be found in "Ferroelectric Liquid Crystals—Principles, Properties and Applications", Volume 7, in the series "Ferroelectricity and Related Phenomena", Editor George W. Taylor, Gordon and Breach Science Publishers, ISBN 2-88124-282-0.

The rest of the operation of this exemplary embodiment of the invention has already been described in conjunction with FIGS. 1 to 3.

Since the difference in the refractive index between the two eigen modes (in this case X-polarized and Z-polarized) may be greater than in lithium niobate, a greater differential group propagation time is obtained for a given physical length, which is advantageous for PMD compensator. A further advantage is the high electrooptical coefficient of a FLC. This allows very small and/or short electrodes ELij to be used, which widens their bandwidth and, for example, can render temperature stabilization superfluous.

Electrodes or electrode parts, in this case including electrode arrangements other than those in FIGS. 1 to 3, may also be applied to the substrate SUB.

Furthermore, additional electrodes may be applied which simplify initial polarization of the liquid crystal. In order to produce an electric field running in the X-direction, large-area electrodes PE1, PE2 are provided on the outsides of the substrate halves SUB, CD in FIG. 12, or the component can be placed on one large-area electrode, or between two large-area electrodes. The bottom of the waveguide can also be occupied by a continuous electrode. In order to produce a field running in the Z-direction, electrodes are provided on the left and right alongside the waveguide on the substrate parts SUB or CD. If they are accommodated on the substrate part SUB, the initial polarization can be produced even without the substrate part CD being fitted, so that the electrodes located there cannot interfere with the Z-profile of the polarization field.

One promising possibility for polarization is to treat or to coat one or more walls of the waveguide chemically, thermally or mechanically. Further design freedom is obtained by the large electrooptical effect in an FLC. The electrode combs can, in some circumstances, in consequence be reduced down to one tine each. This widens the optical bandwidth. A further consequence of the high electrooptical coefficient is that only parts of the waveguide are required for polarization transformation, for example 10 to 200 $\mu$m every 100 to 2000 $\mu$m. In consequence, other materials, for example materials which are more strongly birefringent or which produce less attenuation, can be used for the waveguide parts located between polarization transformers. Possible materials include solid or liquid polymers, nematic liquid crystals and similar materials.

If polymers or silicon are used as substrate, V-grooves may be stamped in or anisotropically etched in in order to connect the invention to optical waveguides composed of quartz glass, which means there is no need for active adjustment, and which thus allow low-cost production. The technique to produce waveguides on silicon or in quartz glass is described, for example, in the Proceedings of the 24th European Conference of Optical Communications, Madrid, Sep. 20 to 24, 1998, pages 319 to 328, and in the references there.

In the exemplary embodiments in FIGS. 1 to 3 the electrooptical coefficient r51 is required, which can vary the polarization by means of a vertical electric field. It would also be possible to use r52, which is used by a longitudinal electric field. If required, the crystal axes can be oriented in order to use other electrooptical coefficients, for example r42 or r41 for a Y-cut and X-propagation direction, r43 or r4 for a Z-cut and X-propagation direction, or r53 or r52 for a Z-cut and a Y-propagation direction.

Until now, birefringent materials have essentially been discussed for PMD compensation. Waveguide birefringence is, of course, often achieved simply by substrate birefringence. It is sufficient for the substrate material or the waveguide itself to be birefringent.

In a generalization of the principle of operation, any arrangement in which mode conversion between two modes that have different propagation speeds may be used for PMD compensation or emulation for PMD compensation. Principal modes thus occur, in general, instead of principle states of polarization. These are those modes which have the greatest possible group propagation time difference. In a longitudinally homogeneous embodiment, principal modes (and principle states of polarization) are identical to the eigen modes.

Figure 13:
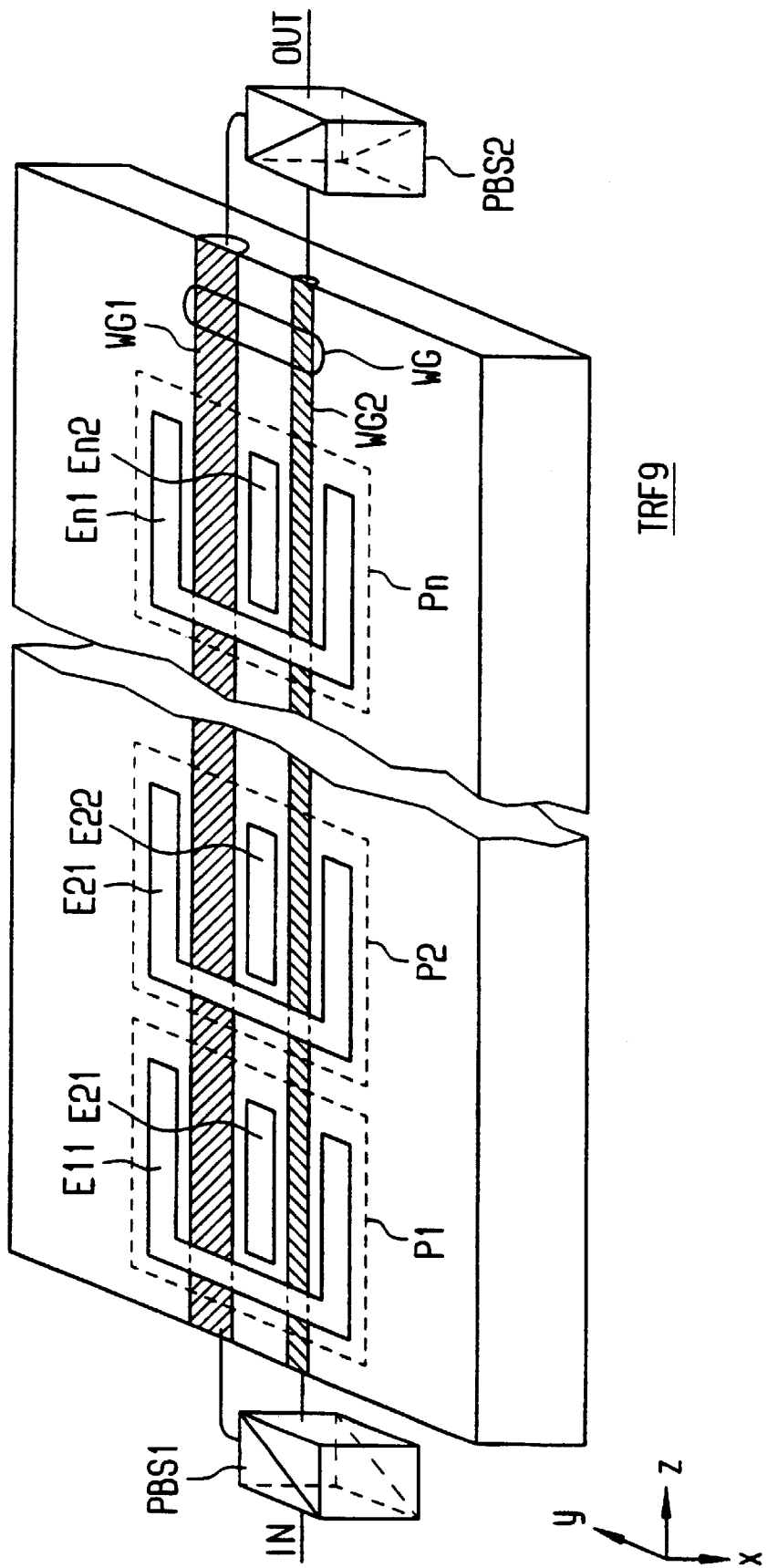
FIG. 13 shows a variant with a two-mode waveguide.

The exemplary embodiment TRF9 in FIG. 13 shows a lithium-niobate crystal with a X-cut and a Z-propagation direction. Other crystal cuts or materials may also be used. This has a two-mode waveguide WG. For its part, the waveguide WG contains two waveguides WG1, WG2. These have different widths, so that they have different group propagation times. They run in proton-replaced material, so that only one polarization can propagate in each case in WG1, WG2 and WG thus has only two modes, namely its two principal modes. Mode converters (P1, . . . Pj, . . . ,Pn) are distributed over WG. With this crystal cut, these each have two electrodes E1j, E2j (j=1 . . . n) which run essentially parallel to the waveguides WG1, WG2. In the area of WG1, WG2, these each produce horizontal electric fields, resulting in a differential phase shift between the two waveguide modes. The coupling between the two waveguides is thus varied by varying the control voltage between the electrodes E1j, E2j, so that the waveguide modes can be converted to one another, to a greater or lesser extent. In order to compensate the PMD, polarization beam splitters PBS1, PBS2 are positioned upstream or downstream of the arrangement.

I claim:

1. A method for compensating for polarization mode dispersion, the method comprising the steps of supplying an optical signal to be compensated to an arrangement having an optical waveguide with principal modes having two substantially different propagation constants, and having a plurality of electrooptical mode converters for converting the principal modes of the waveguide to one another, and individually actuating more than two of the electrooptical mode converters or more than two groups of the electrooptical mode converters by more than two control voltages which are governed by more than two parameters, wherein the polarization mode dispersion of the optical signal is compensated.

2. The method as claimed in claim 1, wherein the two principal modes are orthogonal main polarizations and the waveguide is birefringent.

3. The method as claimed in claim 1, wherein the arrangement has additional differential phase shifters that are also actuated individually and/or in groups individually in such a manner that the polarization mode dispersion is compensated for and/or the operating wavelength is selected.

4. The method as claimed in one of claim 1, wherein at least one voltage, which is used as a control criterion, is obtained by filters and rectification from the baseband signal in a receiving device for compensation.

5. A polarization mode dispersion compensator, comprising a waveguide with principal modes which have two different propagation constants for receiving an optical signal, and a plurality of electrooptical mode converters for converting the principal modes of the waveguide to one another, wherein more than two of the electrooptical mode converters or more than two groups of the electrooptical mode converters are individually actuated by more than two control voltages which are governed by more than two parameters to compensate for the polarization mode dispersion.

6. The polarization mode dispersion compensator according to claim 5, wherein cells are formed from at least two mode converter electrodes.

7. A polarization mode dispersion compensator according to claim 5, wherein at least one mode converter contains a mode converter electrode which is designed like a comb with tines running transversely with respect to the waveguide.

8. The polarization mode dispersion compensator according to claim 7, wherein alternating separations are provided between successive mode converter electrodes.

9. The polarization mode dispersion compensator according to claim 7, wherein the tines of at least two mode converter electrodes in a cell in each case engage in one another.

10. The polarization mode dispersion compensator according to claim 5, wherein a ground electrode which is designed like a comb is provided and has tines and the tines of the mode converter electrodes engage in one another.

11. A polarization mode dispersion compensator according to claim 10, which has a cell of two mode converter electrodes and a ground electrode, said two mode converter electrodes being arranged one above the other with two tines being arranged between two adjacent tines of the ground electrode.

12. The polarization mode dispersion compensator according to claim 5, which includes broader phase-shifter electrodes arranged between the mode converter electrodes and can be actuated individually or in a number of groups, on a group-specific basis.

13. The polarization mode dispersion compensator according to claim 12, which includes a phase-shifter electrode which covers an area between the mode converter electrodes of one cell and an area between two cells.

14. The polarization mode dispersion compensator according to claim 5, wherein the polarization mode dispersion compensator has at least one optical amplifier.

15. The polarization mode dispersion compensator according to claim 5, which includes a dichroic element which has a controllable difference between the gains or attenuations of two orthogonal polarizations.

16. The polarization mode dispersion compensator according to claim 15, wherein a polarization-dependent attenuation or amplification of an optical medium can be compensated-for by controlling a difference between the gains or attenuations of two orthogonal polarizations.

17. The polarization mode dispersion compensator according to claim 5, wherein said compensator is on a substrate composed of a material selected from lithium niobate, lithium tantalate, III/V semiconductors, silicon, silicon dioxide and polymer.

18. The polarization mode dispersion compensator according to claim 17, wherein the waveguide contains a polymer or a liquid crystal.

19. The polarization mode dispersion compensator according to claim 5, wherein the waveguide is folded at least once by reflection.

20. The polarization mode dispersion compensator according to claim 5, wherein said compensator is provided in a receiving device and at least one voltage which is used as a control criterion is obtained by filters and rectification of the baseband signal.

21. The polarization mode dispersion compensator according to claim 5, wherein said compensator is provided as an externally adjustable emulator.

22. The polarization mode dispersion compensator according to claim 5, wherein the two principal modes are orthogonal main polarizations, and the waveguide is birefringent.

* * * * *